July 16, 1963 — J. H. AUER, JR — 3,098,213
ULTRASONIC VEHICLE DETECTION SYSTEM
Filed May 20, 1960 — 6 Sheets-Sheet 1

FIG. 1.

INVENTOR.
J. H. AUER JR.
BY
HIS ATTORNEY

July 16, 1963 J. H. AUER, JR 3,098,213
ULTRASONIC VEHICLE DETECTION SYSTEM
Filed May 20, 1960 6 Sheets-Sheet 2

INVENTOR.
J. H. AUER JR.
BY
Forrest D. Hitchcock
HIS ATTORNEY

United States Patent Office 3,098,213
Patented July 16, 1963

3,098,213
ULTRASONIC VEHICLE DETECTION SYSTEM
John H. Auer, Jr., Rochester, N.Y., assignor to General Signal Corporation, a corporation of New York
Filed May 20, 1960, Ser. No. 30,667
17 Claims. (Cl. 340—38)

This invention relates to the detection of objects and especially vehicles, and more particularly pertains to such systems wherein the objects or vehicles are detected as a result of the effects produced by their passing through a beam of sound energy. This invention is analogous in subject matter to and an improvement over what is disclosed and claimed in the prior applications of H. C. Kendall et al., Ser No 808,736, filed April 24, 1959, now Patent No 3,042,303, issued July 3, 1962, and of J. H. Auer, Jr., Ser. No. 846,917, filed October 16, 1959, both of which are assigned to the assignee of the present invention This application is a continuation-in-part of my aforesaid application Serial No. 846,917.

In the vehicle detection system disclosed in the prior application, Ser. No. 808,736, a beam of repetitive sound pulses is transmitted across the path of each object or vehicle. A receiver is provided which includes a sound transducer so positioned and directed that it is responsive to the transmitted sound energy after its reflection from the surface of the object or vehicle as it intercepts a transmitted sound beam. The transmitted sound beam is additionally so directed and the receiving transducer so positioned that, in the absence of any vehicle, the transmitted sound energy is reflected from a fixed reflecting surface to the receiving transducer. Such an arrangement may readily be provided by positioning both transmitting and receiving transducers over a lane of traffic and with both directed downwardly so that the transtransmitted sound beam is directed toward and reflected from the tops of passing vehicles back towards the receiving transducer. When no vehicle is present, the sound pulses are instead reflected from the pavement back toward the receiving transducer. Thus, for each transmitted sound pulse, the receiving transducer receives either a reflected sound pulse from the pavement when no vehicle is present or instead receives a reflected sound pulse from the top of each passing vehicle when such vehicle is present in the sound beam.

Because of the considerably longer propagation time that is involved when a reflection is received from the pavement rather than from the top of a passing vehicle, each pavement reflection pulse is received at a later time with respect to the transmitted pulse than is the vehicle reflection pulse. Electronic gating circuits are used which demarcate successive time intervals following the transmission of each sound pulse, and these gating circuits make it possible to distinguish a pavement reflection from a vehicle reflection. It should be mentioned here that the repetition rate of the transmitted sound pulses is made sufficiently slow to permit each sound pulse to be received by the receiving means following its reflection from an object or vehicle within the designated detection zone prior to the transmission of the next sound pulse. This requirement eliminates ambiguity since it relates each reflected pulse definitely to the last-transmitted pulse.

A high degree of accuracy in object detection is achieved in such prior system of application Ser. No. 808,736, by the ability to discriminate between the desired objects or vehicles to be counted and other extraneous objects, and this is brought about, in part, by so organizing the system that a single count can be registered only by going through a prescribed cycle of events. Such cycle comprises: first, the reception of reflections from the top of the passing vehicle; second, the interruption of sound reflections from the pavement; third, the re-establishment of reflections from the pavement; and fourth, the absence of vehicle reflections. The re-establishment of reflections from the ground indicates the departure of the object or vehicle from the detection zone. The dual requirement that vehicle reflections be received and pavement reflections be concurrently interrupted for a vehicle to be registered is of considerable effect in eliminating spurious responses of the system which might otherwise result from the passage of people or animals through the detection zone and also provides that a vehicle having a plurality of sound reflecting surfaces spaced by non-reflecting surfaces (a convertible car, for example) will be counted as a single vehicle rather than as two separate vehicles corresponding to each of the sound reflecting surfaces. These characteristics are explained in considerable detail in the previously-mentioned Kendall et al. application Serial No. 808,736.

With this general understanding of an ultrasonic vehicle detection system of the kind disclosed in the application Serial No. 808,736, consideration will now be given to the solutions offered by the present invention to several problems which may at times arise in the operation of such a vehicle detection system. Referring to the previously mentioned application of Auer, Serial No. 846,917, this prior application discloses a control system for the operation of a gate or other barrier controlling entry and exit of vehicles into and out of a parking lot or other area having limit access. The prior application shows that it is frequently necessary in such a system that several different and independent vehicle detector units be provided within a restricted space so that they are quite close to each other. This is only one typical example of a particular field of application where it is at times necessary to closely space several vehicle detector units. Another typical field of use where this problem arises is in the counting of vehicles passing through an unrestricted opening as, for example, the entrance to a parking garage. Such a system is particularly shown in the prior application of N. A. Bolton, Serial No. 841,389, filed September 21, 1959, and also assigned to the assignee of this invention. This prior application discloses that a plurality of transducer units may be necessary at closely-spaced intervals across the garage opening.

It has been found in practice that, where several transducer units operate simultaneously quite close to each other, there may be interference between them in that sound pulses originating from the transmitting transducer of one vehicle detector unit may be erroneously received by the receiving transducer of a nearby vehicle detector unit. It has been found that such extraneous reflections may travel by a devious path, and may under some circumstances be reflected from various fixed reflecting surfaces in the area and at other times from passing vehicles. Despite the high degree of discrimination inherent in vehicle detector systems of the kind described briefly above, it has nevertheless been found that such extraneous reflections may, under certain circumstances result in erroneous vehicle counting.

It is contemplated, by the present invention, to provide several practical expedients by which the foregoing problem may either be greatly reduced or eliminated entirely. One manner in which this can be done is to synchronize the transmission of sound pulses from adjacent transmitting transducers. Although this does not solve the problem in all instances, it does provide a means of controlling the undesirable effects so that they may be compensated for. Another solution to this problem presented by the present invention is to alternate the transmission of sound pulses from adjacent transmitting transducers. As will be shown, this considerably reduces the interference problem since the reception by the receiving transducer of one vehicle detector unit of a sound pulse originating with the transmitting transducer of a nearby unit will be received at a time when the various gating circuits associated with the first unit are, in effect, closed. Therefore, no false response can be produced.

It is, therefore, an object of the present invention to provide a sonic vehicle detection system wherein interference between adjacent vehicle detector units is either greatly minimized or eliminated entirely.

It is another object of this invention to provide a supersonic vehicle detection system wherein sound pulse transmission by adjacent vehicle detection units is synchronized.

It is another object of the present invention to provide a supersonic vehicle detection system wherein sound pulse transmission from adjacent vehicle detector units ordinarily interfering with each other is greatly reduced by alternating the transmission of sound pulses between the two units.

Other objects, purposes, and characteristic features of this invention will be in part obvious from the accompanying drawings and in part pointed out as the description of the invention progresses.

To simplify the illustrations and facilitate in the explanation of this invention, various parts and circuits which constitute the embodiment thereof are shown diagrammatically and certain conventional circuits are disclosed in block form since the drawings have been made more with the purpose of making it easy to understand the principles and mode of operation than to illustrate the specific construction and arrangement of parts that might be used in practice. The symbols (B+) and (B—) are used to indicate the positive and negative terminals, respectively, of a source of direct current suitable for the operation of electron tubes and having an intermediate terminal represented by the symbol for a ground connection. Similarly, the symbols (+) and (—) are used to indicate connections made to the opposite terminals of a source of lower voltage particularly suitable for the operation of various relays, counting devices, and the like.

In describing the invention in detail, reference will be made to the accompanying drawings in which like reference characters designate corresponding parts throughout the several views and in which.

*General Description*

Figure 1:
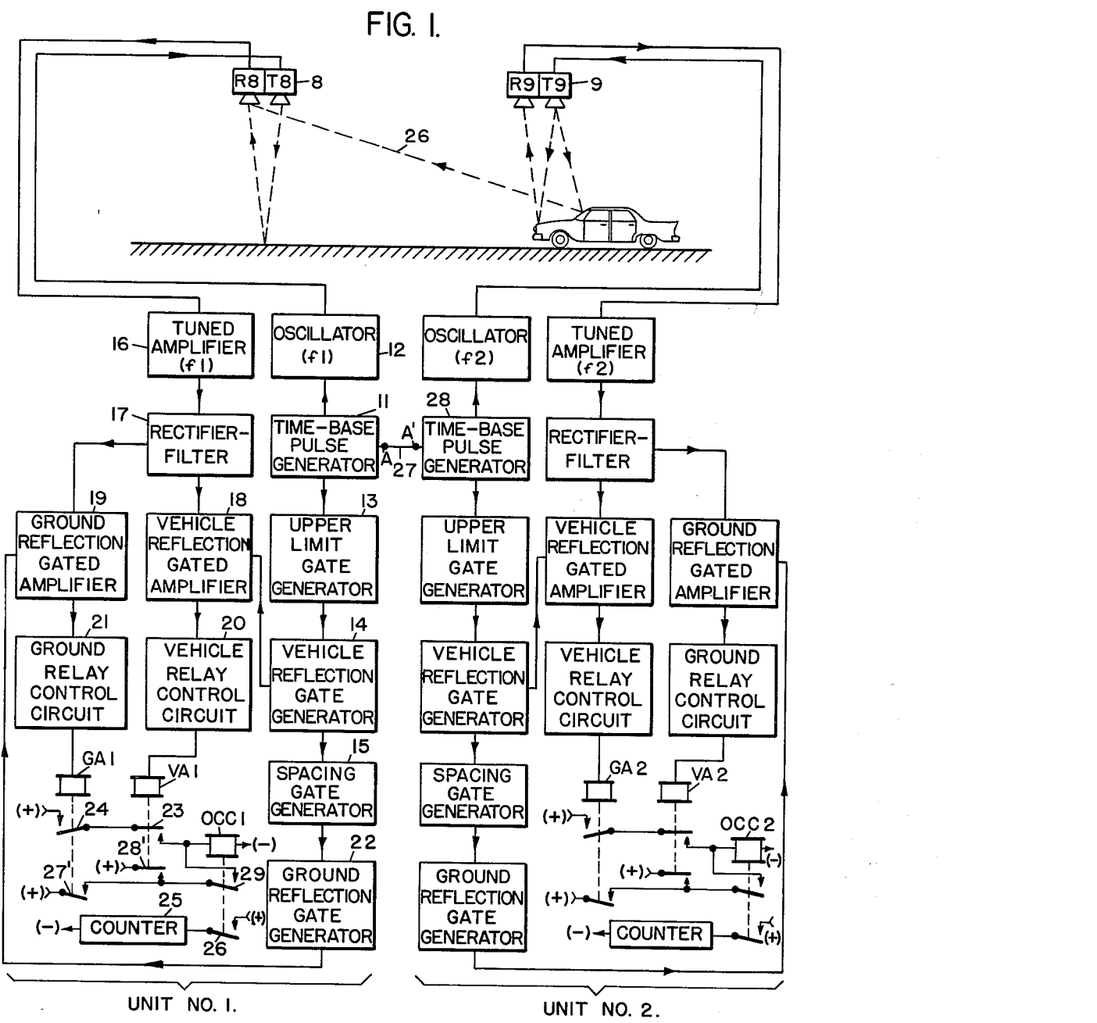
FIG. 1 is a block diagram illustrating the organization of one specific embodiment of the invention for reducing interference between adjacent vehicle detection units.

Referring to the drawings, FIG. 1 shows a typical situation where two transducer units 8 and 9 each including both receiving and transmitting transducers are relatively closely spaced so that a sound pulse originating with the transmitting transducer T9, for example, may be received by the receiving transducer R8. In FIG. 1, the reflection causing this undesirable condition is shown as occurring from the surface of a car intercepting the sound beam emanating from the transducer T9. However, such extraneous reflections may also occur from various fixed objects as well as from vehicles. It should also be understood that the problem arises also where the two transducer units are not both disposed along the same path traversed by a vehicle as in FIG. 1 but are instead along adjoining paths.

In FIG. 1, each transducer unit is shown connected to a corresponding vehicle detection unit. Referring to unit No. 1, the apparatus is shown as including a time base pulse generator 11 whose function is to provide regularly occurring electrical pulses whose frequency establishes the repetition rate of pulse transmission and whose duration establishes the length of each transmitted sound pulse. The output pulses of this pulse generator 11 are applied to an oscillator 12 as a gating input, causing it to provide a short burst of A.C. energy at a predetermined ultrasonic frequency for each output pulse of the pulse generator 11. Each output of the oscillator 12 is then applied to the transmitting transducer T8 which converts it to acoustical energy which is transmitted downwardly toward the surface to the pavement. Line A of FIG. 2 graphically illustrates the periodic operation of the time base pulse generator 11 and oscillator 12. Thus, throughout each negative-going voltage variation shown at line A, sound energy is transmitted from the transmitting transducer.

Each sound pulse transmitted by the transmitting transducer T8 and reflected from a passing vehicle is received by the associated receiving transducer R8 after a relatively short propagation time which is obviously considerably less than that required when the sound pulse is reflected from the pavement. In order to distinguish the vehicle reflections from the pavement reflections, it is necessary to provide separate, successive gating voltages following each transmitted pulse. One of these must encompass the expected time of arrival of a vehicle reflection. This gating voltage must be of fairly lengthy duration since a vehicle reflection may be variously delayed with respect to the originated pulse dependent, for example, upon whether the sound pulse is reflected from the roof of the car, or its hood or trunk. As will later be shown, this gating voltage may be applied to an amplifier to which all received signals are also applied, and this amplifier, being thus gated, will only produce an output pulse for those signals received during the time it is gated.

A subsequent gating voltage is provided which encompasses the expected time of reception of pavement reflections. Such gating voltage is applied to another amplifier which also receives all of the received signals so that an output signal is produced only for those sound pulses which are received during the existence of such gating voltage.

The vehicle gate need not start immediately at the time of transmission of the originating sound pulse since no bonafide reflection signal can be expected in the interval immediately following the transmission of the pulse. Therefore, it is desired instead to wait for a predetermined interval before initiating the operation of the gate generating circuit which will produce the vehicle reflection gate. This is accomplished by the upper limit gate generator 13 which demarcates a predetermined time interval following the generation of each output pulse by the time base pulse generator 11. The operation of this upper limit gate generator is clearly illustrated at line B of FIG. 2. Upon the termination of the output voltage provided by the upper limit gate generator 13, the vehicle reflection gate generator 14 is put into operation. As shown at line C of FIG. 2, this gate generator 14 demarcates a relatively longer time interval so that it will encompass vehicle reflection pulses despite their differing propagation times as described previously.

Figure 2:
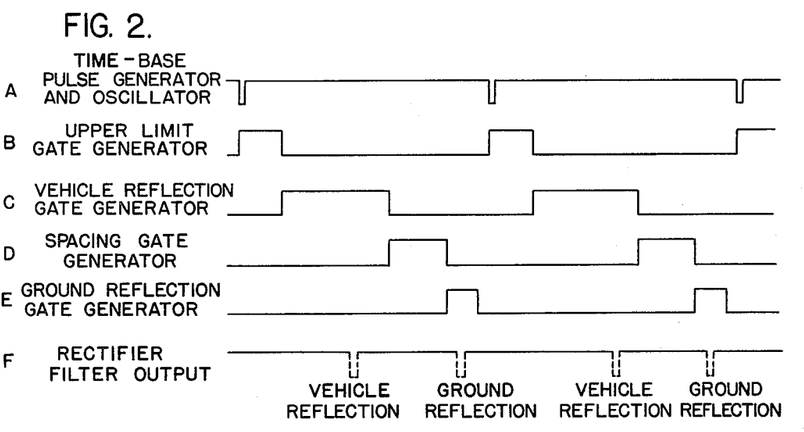
FIG. 2 is a simplified timing diagram illustrating the operation of various gating circuits used in the embodiment of FIG. 1.

Although the gating voltage which is intended to encompass the expected time of reception of pavement or ground reflection pulses could start directly after the termination of the vehicle gating voltage, it is ordinarily desirable to delay its initiation for some time. The reason for this is that the round-trip propagation time of the sound pulse reflected from the pavement is ordinarily a constant quantity so that the gate provided for it need not be of long duration. It is therefore preferable to have it short so that an output will not be erroneously provided for any spurious signal which might be received just prior to the expected reception of the pavement reflection pulse. It is for this reason that the spacing gate generator 15 is provided. As shown in FIG. 2 at line D, this spacing gate generator demarcates a relatively short interval following the termination of the vehicle gate and just prior to the generation of the sound reflection gate.

The sonic energy received by each receiving transducer such as transducer R8 is converted by it into an electrical signal which is applied to a tuned amplifier 16. This amplifier not only amplifies the received signal but also tends to reject, by reason of its various tuned circuits, various extraneous signals which might be received and which occur at other frequencies as compared to that of the desired reflection pulse.

The output of the tuned amplifier 16 is an A.C. signal which is applied to the rectifier-filter 17. The rectifier-filter first rectifies the input signal to provide a unidirectional signal, and the associated filter removes the alternating-current components of this signal, leaving a direct-current signal whose wave shape corresponds to the envelope of the output of the tuned amplifier 16. The resulting signal is applied to the input of both the vehicle reflection gated amplifier 18 and the ground reflection gated amplifier 19.

The vehicle reflection gated amplifier 18 is so constructed that whenever the vehicle reflection gating voltage from the gate generator 14 and an output signal from rectifier-filter 17 are concurrently applied thereto, it will provide an output signal to the vehicle relay control circuit 20. In a similar manner, the ground relay control circuit 21 receives an input signal for each input signal from the rectifier-filter 17 occurring at a time when this amplifier 19 is receiving the gating voltage generated by the ground reflection gate generator 22. From this it follows that when no vehicle is present, the ground relay control circuit 21 ordinarily receives an input pulse from the amplifier 19 for each sound pulse transmitted by the transmitting transducer T8. Sound pulses should ordinarily not be received at the time of each vehicle gate so that it can be expected that the vehicle relay control circuit 20 will not receive an input signal for each transmitted sound pulse. On the other hand, when a vehicle is directly below the transducer unit, the ground reflections pulses are then cut off and instead vehicle reflection pulses are received. Under these circumstances, the above-described conditions with respect to the relay control circuit should be reversed, i.e., the vehicle relay control circuit 20 should receive an input pulse from amplifier 18 for each transmitted sound pulse, but the ground relay control circuit 21 should then not receive any input pulses from amplifier 19.

Both relay control circuits are so organized, as will subsequently be described, that the associated relay is picked up when the relay control circuit receives no input pulses but is dropped away when the associated relay control circuit does receive periodic input pulses. Thus, the normal condition of these relays is such that the vehicle relay VA is normally picked up but the ground relay GA is normally dropped way. Therefore, back contact 23 of relay VA1 and also front contact 24 of relay GA1 are normally both open so that no energy is applied to the occupancy relay OCC1. Therefore, front contact 26 of relay OCC1 remains open and the counter 25 is deenergized. On the other hand, when a vehicle is present underneath the transducer unit 8, then relay GA1 is picked up and relay VA1 dropped away so that the contacts 23 and 24 are both closed and energy is thus applied through an obvious circuit extending from (+) and these two mentioned contacts to the occupancy relay OCC1 and then to the (−) terminal, so that relay OCC1 picks up and counter 25 is then energized. However, it is only when relay OCC1 is again dropped away that the counter 25 becomes once more deenergized so that it will again be in proper condition for a subsequent reenergization to store a successive count therein. In other words, upon the departure of the vehicle from the detection zone, defined by transducer unit 8, the relays GA1 and VA1 are both restored to their normal condition, relay OCC1 drops away because the above described circuit then opens, and the circuit for the energization of counter 25 is interrupted. Unless both relays GA1 and VA1 are both restored to their normal conditions upon the vehicle's departure, a stick circuit through either front or back contact 27' or 28' of these relays, respectively, and through front contact 29 of relay OCC1 so that relay OCC1 cannot drop away. As long as this condition is maintained, counter 25 is unable to register a further count.

The unit No. 2 which is associated with the transducer unit 9 is identical to the unit No. 1 just described. Where such units are operating in close proximity as is shown in FIG. 1, for example, it is often desirable to transmit the sound pulses from their respective transmitting transducers at different frequencies. This is illustrated in FIG. 1 by showing that the two oscillators operate at different frequencies designated as F1 and F2, respectively. This tends to some extent to reduce the interference between such adjacent units. In other words, a stray reflection originating from transducer T9 and represented by the ray 26 may comprise sound energy of a somewhat different frequency from that transmitted by the transmitting transducer T8. In such event, the effect of such stray reflection upon the receiving transducer R is reduced. It has nevertheless been found that this expedient by itself is frequently not sufficient to guard against the undesired results that such stray reflections may produce. In other words, the stray reflected sound pulses may have sufficient amplitude that, when received by the receiving transducer of an adjacent unit, they are able to produce an output from the associated receiving circuits despite this frequency discrimination. Ordinarily, the mere reception of such stray pulses would not produce an erroneous registration since, as the above description points out, it is necessary that the normally received ground reflections be also terminated. However, this latter condition may readily be met when a person, for example, walks in the sound beam so as to cut off the ground reflection even though a person is ordinarily not a good enough reflection of sound to give the equivalent of a vehicle reflection. In other words, if at the time a person is blocking the normal ground reflections, extraneous sound pulses are received by stray reflections from adjacent units, then all the required conditions are met for vehicle registration and an erroneous output is produced.

In FIG. 1, it has been shown that the stray pulses are produced by a vehicle which is within the detection zone of one of the transducer units. More frequently, however, such extraneous reflections result by reflections of the sound pulses from various fixed sound reflecting surfaces in the immediate area. In that event, such extraneous sound reflections will occur at an adjoining receiving transducer with a substantially fixed delay time with respect to the originating pulse, rather than the variable delay that a vehicle provides. However, even a spurious reflection having a fixed delay with respect to the time of occurrence of the originating pulse will have a continuously variable delay with respect to sound pulses generated at a nearby unit assuming, as is usually the case, that the repetition rates at the two adjacent units are at least slightly different. It may be considered, therefore, that such interfering reflections upon their reception at a nearby unit have a varying phase relationship with respect to the pulses originating at such unit and reflected back to it. Therefore, a stray reflection pulse from one unit may be received at any time in cycle of a nearby unit so that it may be received during the occurrence of the vehicle reflection gate or the ground reflection gate or at any time between successive sound pulses.

*Embodiment of FIGS. 1 and 2*

When it has been determined that the interference between adjacent units does in fact occur as a result of reflections of sound pulses from fixed objects, such interference may at times be reduced or even entirely eliminated by synchronizing the pulse generation between the adjacent units. This synchronization does not necessarily eliminate the reception of such stray reflection pulses by the adjacent receiving transducer but, by eliminating the varying phase relationships between the interfering units, it does insure that such stray pulses are always received with the same time delay with respect to the sound pulses that are transmitted at such adjacent unit. It then may be possible to adjust the various gating voltages at such other transducer location so that neither the vehicle reflection gate nor the ground reflection gate will be in effect at the time of reception of such stray reflection pulses. In other words, if at the time such stray reflection pulse is received, only the upper limit gating voltage, for example, or the spacing gate voltage are in effect, then such stray reflection will produce no effect at all upon the receiving circuits of such other transducer unit.

Such synchronization of the pulse generation by nearby vehicle detector units is illustrated diagrammatically in FIG. 1 by the connection 27 which is made between the time base pulse generator 11 of unit No. 1 and the similar generator 28 of unit No. 2.

Figure 3:
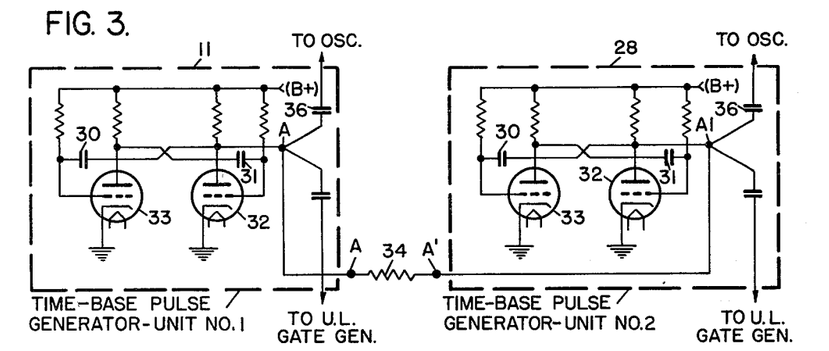
FIG. 3 is a circuit diagram illustrating in greater detail a portion of the embodiment of the invention illustrated in FIG. 1.

A practical circuit which may be utilized to effect this synchronization of the two time base pulse generators is shown in FIG. 3. Each one is shown as comprising a free-running multivibrator comprising two electron discharge tubes whose plate and grid circuits are interconnected. The operation of such a multivibrator circuit is well-known in the art and need not be described in detail here. Briefly, it may be stated that one or the other of the two tubes is at all times fully conductive and the other fully cut off, and the multivibrator switches from one to the other of these states at a predetermined rate as determined by the time constant for the discharge of the capacitors 30 and 31, respectively connecting the plate of one tube to the control grid of the other. When the right-hand tube 32 of each multivibrator becomes suddenly conductive, there is an abrupt decrease of its plate voltage, and this negative-going voltage variation is coupled to the control grid of the left-hand tube 33 through the coupling capacitor 30. The resulting negative pulse on the control grid of such tube 33 causes this tube to become nonconductive so that its plate voltage rises and a positive-going voltage variation is then coupled through the capacitor 31 to the control grid of the right-hand tube 32 thereby making tube 32 fully conductive. The negative-going voltage appearing at the plate of tube 32 whenever this tube conducts is coupled through capacitor 36 to the oscillator 12. This oscillator 12 includes a differentiating circuit which produces a short trigger pulse in response to such negative-going voltage, and this trigger pulse acts upon a conventional electronic oscillator causing it to generate an ultrasonic frequency pulse throughout the duration of such trigger pulse. It is desired that this trigger pulse be of short duration, in the order of one millisecond, so that a relatively short burst of ultrasonic energy will be generated. Clearly the repetition rate of the ultrasonic frequency pulses which are thus generated is dependent entirely on the frequency of operation of this multivibrator.

The connection between the two multivibrators, designated by the reference character 27 of FIG. 1, is shown in this FIG. 3 as comprising a connection from the plate of the right-hand tube 32 of each multivibrator to the plate of the corresponding tube in the other multivibrator. A decoupling resistor 34 is included in such interconnection. If there is any tendency for these two multivibrators to operate at different frequencies, and assuming that the tube 32 of the pulse generator 11 is first to become conductive, the resulting negative-going voltage variation at the plate of such tube (point A) is then immediately coupled to the plate of the other tube (point A'). This negative-going voltage variation at point A' is coupled to the control grid of the associated tube 33 through capacitor 30 and causes the multivibrator to instantly reverse its state in the manner described above. Similarly, if conditions were reversed so that tube 32 of pulse generator 28 were the first to become conductive, then a negative-going voltage pulse would be transferred to point A and reverse the state of this multivibrator. Whenever either tube becomes nonconductive, a positive-going voltage pulse is transferred to the plate of the corresponding tube in the other multivibrator over connection 34. But, such positive pulse may or may not cause the tube 32 in such other multivibrator to become nonconductive dependent upon the then existing degree of charge on the associated capacitor 30. If it becomes desirable to employ such positive pulse to establish exact synchronization in this portion of the cycle, then the components can be adjusted to be very closely identical so that the charge on capacitor 30 will be such that the positive pulse can effect nonconductivity. Such synchronization in mid-cycle ordinarily not of especial significance, however, since no ultrasonic pulses are generated at that time. Thus, the connection provided between the points A and A' ensures that they will operate in synchronism so that sound pulses are transmitted at the same time from the two nearby transmitting transducers.

Under certain conditions, therefore, the synchronization of pulse transmission in the manner described above will reduce and in some cases eliminate the interference between adjacent units. As pointed out, the reason for this is that with respect to a particular vehicle detection unit, the incidence of interfering sound pulses from an adjacent unit can then be more readily controlled in the sense that the interfering pulses will then generally appear at the same time each cycle, thereby permitting them to be rejected, in effect, by the gating circuits. This is particularly so when the interfering sound pulses represent reflections from fixed reflecting surfaces.

Figure 4:
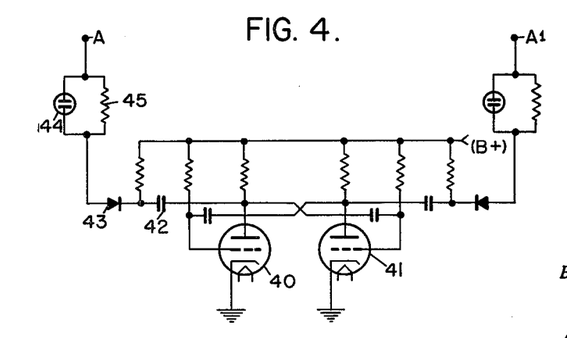
FIG. 4 is a circuit diagram illustrating how the embodiment of FIG. 1 may be modified to constitute an alternative embodiment of the present invention.

*Embodiment of FIG. 4*

There are, however, numerous instances where the above expedient for reducing interference is not sufficiently effective. One reason for this is that the interfering sound pulses may be received at a particular time when it is impossible to exclude them by the gating circuits. For example, this might occur when interfering sound pulses are received at the same time that ground reflection pulses would be expected to be received at the particular unit being troubled by the interference problem. Moreover, the problem may be difficult to solve by the above-mentioned means when the interference is caused by vehicles or other moving objects since then the time of occurrence of the spurious reflections will naturally tend to be more random. When such a situation is encountered, it becomes desirable to employ either the embodiment of FIG. 4 or that of FIG. 6.

The embodiment of the invention illustrated in FIG. 4 may be used when two separate vehicle detection units, each having its own receiver, are used as shown in FIG. 1. To practice this embodiment of the invention, it is only necessary that the circuit organization of FIG. 4 have its respective terminals A and A' connected to the corresponding terminals A and A' respectively of FIG. 1 in place of the wire 27. The circuit of FIG. 4 comprises another multivibrator circuit and its effect, when connected in the manner suggested, is to provide triggering inputs to the two time base pulse generators 11 and 28, respectively, so that they operate alternately. The result is that one vehicle detector unit transmits a sound pulse, and then, in effect, "listens" for reflections of such transmitted sound pulse either from the pavement or from a passing vehicle. Throughout this time, the other vehicle detector unit is inoperative in the sense that none of its gating circuits are effective. However, after the termination of the various gates associated with the transmission of the first pulse, then the other vehicle detector unit comes into operation and transmits its sound pulse. During this interval and immediately thereafter while such second unit is "listening" for reflections of such sound pulse, the first unit and its various gating circuits are then inoperative. Because of this alternating mode of operation, each unit has its various gating circuits inoperative and nonresponsive throughout the time that spurious reflections might be received from a sound pulse transmitted from an adjacent unit.

The circuit of FIG. 4 comprises another free-running multivibrator similar in operation to the time base pulse generator previously described. The two tubes 40 and 41 of this multivibrator conduct alternately and for substantially equal periods of time, switching back and forth between their conductive and nonconductive states at a predetermined frequency. The plate of tube 40 is coupled to terminal A through coupling capacitor 42, diode 43, and the parallel combination of resistor 45 and neon lamp 44. The plate of tube 41 is similarly coupled to the terminal A'. These terminals designated A and A' in FIG. 4 are intended to be connected to the corresponding terminals A and A' shown in FIG. 3.

Figure 5:
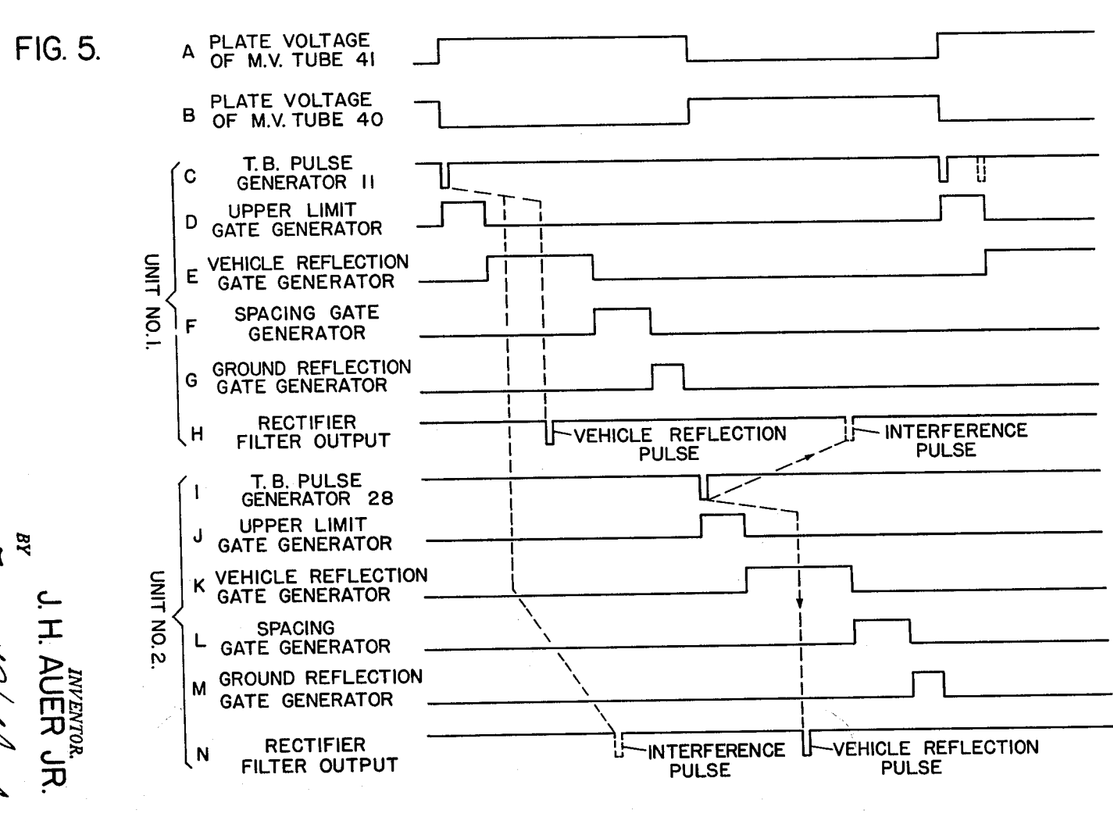
FIG. 5 is a timing circuit diagram illustrating the operation of the embodiment of the invention disclosed in FIG. 4.

The square wave of voltage appearing at the plates of the two multivibrator tubes 40 and 41 is shown in the first two lines of the waveform diagram of FIG. 5. When either tube is conductive, its plate voltage is at a low level, but when the tube is nonconductive its voltage is at a considerably higher value. A rise in voltage at the plate of either tube is not coupled to the respective terminal A or A' because of the blocking effect of the diode 43. However, each negative-going voltage variation at the plate of either tube does appear at the corresponding output terminal A or A'. The function of the neon lamp such as lamp 44 included in the coupling circuit from the plate of the multivibrator tube to the respective output terminal is to prevent the appearance at such output terminal of various spurious voltages which might otherwise appear and also provides a visual indication, by its intermittent flashing, that the multivibrator is operative. More specifically, spurious voltages of low amplitude which are not sufficient to cause a breakdown of the gas in the lamp 44 are precluded from appearing at the associated output terminal; it is only when there is a voltage variation of substantial amplitude at the plate of the multivibrator tube that an output pulse will appear at the respective output terminal. To summarize, the effect of the operation of this multivibrator circuit is to cause negative-going trigger pulses to appear alternately at the terminals A and A'.

Since the multivibrator of FIG. 4 causes negative-going trigger pulses to appear alternately at terminals A and A' of the two time base pulse generators shown in FIG. 3, it will be apparent that these pulses cause the two multivibrators included therein to operate alternately. That is, every time there is a negative-going trigger pulse at terminal A, tube 33 of the pulse generator 11 is made nonconductive and this drives the opposite tube 32 to a conductive state, thereby resulting in a negative trigger pulse at the plate of this tube 32 in the manner shown at line C of FIG. 5. Shortly thereafter, the self-timing characteristics of this time base pulse generator cause it to operate to the condition wherein tube 32 becomes nonconductive so that the voltage at the plate of this tube is restored to its normal high level. The multivibrator remains in this condition with tube 32 nonconductive until another negative-going trigger pulse again appears at terminal A.

Where interference between nearby units is not a problem so that there is no need to apply pulses to the terminals A and A' of the time base pulse generators, so as to alternate their operation, the length of time within which tube 32 remains nonconductive is determined entirely by the characteristics of the free-running multivibrator. However, when it is desired instead that tube 32 be made conductive upon the occurrence of a trigger pulse at point A or A', it is then desirable to modify the timing characteristics of the multivibrator.

Thus, each multivibrator may be constructed to operate as a one-shot multivibrator so that tube 32 can become conductive only in response to a pulse at the respective terminal A or A'. If this is done, the inherent timing characteristics of such a one-shot multivibrator determine the length of time that tube 32 remains conductive, and it switches of its own accord back to the normal state wherein tube 32 is nonconductive. Alternatively, each multivibrator may still be operated in the free-running manner but it is then necessary to alter its timing characteristics by lengthening the interval throughout which tube 32 remains nonconductive so that this tube will be made conductive by a pulse at its respective terminal A or A' before it would ordinarily become conductive by the timing characteristics of its own multivibrator. Thus, referring to line C of FIG. 5, the negative-going voltage variation shown in dotted line and caused by tube 32 becoming conductive tends, in the absence of any pulse at point A, to occur at a time somewhat later than it is actually desired to occur. However, sometime before the multivibrator would otherwise flip to its opposite state with tube 32 conductive, a negative-going trigger pulse appears at point A and forces the multivibrator to its opposite state with tube 32 conductive.

As illustrated in FIG. 5, the rate of operation of the triggering multivibrator shown in FIG. 4 is selected so that after the occurrence of a trigger pulse at point A, no trigger pulse appears at point A' to initiate the transmission of a sound pulse from such vehicle detector unit until all the various gating circuits associated with the first vehicle detector unit have gone through their normal cycle of operation. In other words, following the occurrence of the negative-going pulse at line C which illustrates the operation of the timing base pulse generator for unit No. 1, there is no corresponding operation of the multivibrator in the pulse generator 28 for vehicle detector unit No. 2 until after the ground reflection gate generator for unit No. 1 has returned to normal. Similarly, there is no further operation of the timing pulse generator 11 for unit No. 1 until the ground reflection gate generator of unit No. 2 has been restored to its normal condition. It will be obvious from this description, therefore that the effective repetition rate of the system is considerably slower over that which can otherwise be used. In other words, each unit must observe a period of silence during which the nearby unit is in effect, and visa versa.

The waveform diagram of FIG. 5 clearly illustrates how this embodiment of the invention avoids interference between nearby units. For example, a sound pulse generated in response to the operation of the timing pulse generator 11 as shown at line C may subsequently appear as an interference pulse input to the receiving circuits associated with vehicle detector unit No. 2 and thus appear as an output signal of the rectifier-filter of such other receiver as indicated at line N of FIG. 5. However, it should be noted that at that time, none of the gating circuits of this unit No. 2 are then operative so that none of the relays associated therewith can erroneously be operated even though such interfering signal might occur repetitively or successive cycles.

Similarly, the sound pulse transmitted from unit No. 2 at the time the time base pulse generator 28 provides its negative-going output (see line I, FIG. 5) may subsequently produce an interference pulse at the output of the rectifier-filter of unit No. 1 as indicated at line H of FIG. 5. However, this interference pulse also occurs at a time when none of the gating circuits of this unit No. 1 are then operative so that such interference pulse can have no effect upon the output circuits of this other unit.

Figure 6:
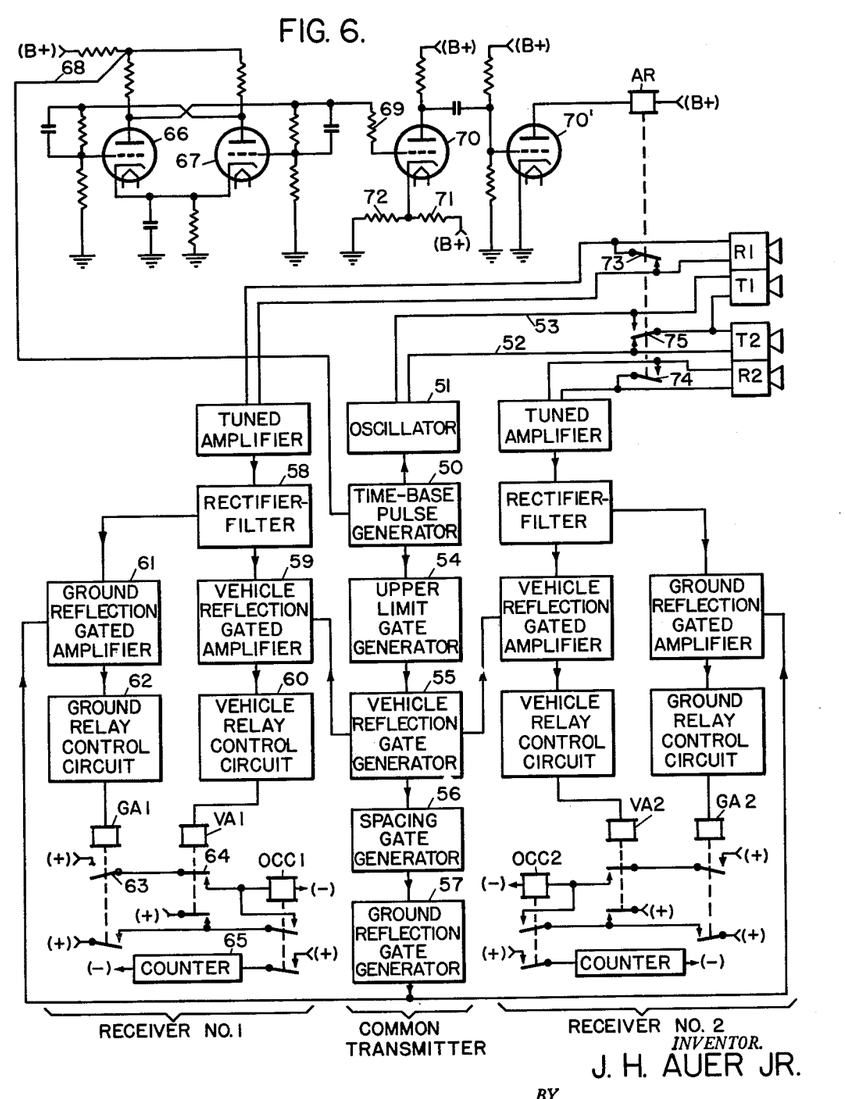
FIGS. 6, 7 and 8 each diagrammatically illustrate various alternative embodiments of this invention.

Embodiment of FIG. 6

The embodiment of the invention described above has disclosed one manner in which interference between adjacent units may be eliminated by alternating sound pulse transmissions from the two units. However, the means employed is a practical one only when separate pulse generating means are provided for the two respective interfering transducer units, since only then is it possible to alternate operation of the respective time base pulse generators. On the other hand, since it is frequently desirable to use pairs of vehicle detector units, it has been found expedient to employ only a single pulse generator means for each pair of transducer units. Such an organization is shown in FIG. 6 where a common transmitter controls two separate receivers each one having associated therewith both a receiving and a transmitting transducer.

The common transmitter shown in FIG. 6 is practically identical with the transmitter portion of either of the vehicle detector units of FIG. 1. More specifically, a time base pulse generator 50 including an asymmetrical multivibrator establishes the repetition rate of pulse transmission and also the duration of each sound pulse that is transmitted. Each short, negative-going output pulse of this time base pulse generator such as is shown at line C of FIG. 5 causes the oscillator 51 to produce an output pulse at a predetermined ultrasonic frequency, and each such output pulse is applied to the wires 52 and 53. At the same time, each output pulse of the time base pulse generator initiates the successive operations of the upper limit gate generator 54, the vehicle reflection gate generator 55, the spacing gate generator 56 and the ground reflection gate generator 57, all in the manner illustrated in the waveform diagram of FIG. 5.

Each receiver also corresponds with that found in either vehicle detector unit No. 1 or No. 2 of FIG. 1. Thus, an output pulse of the rectifier-filter 58 occurring when the vehicle reflection gate generator is providing its positive gating voltage will cause the vehicle reflection gated amplifier 59 to provide a pulse to the vehicle relay control circuit 60. A continued occurence of such input pulses to the vehicle relay control circuit 60 causes the normally picked-up relay VA1 to drop away. In a similar manner, an output pulse from the rectifier-filter 58 occurring at a time when the ground reflection gated amplifier 61 is receiving a positive gating voltage from the ground reflection gate generator 57 will result in an input pulse being applied to the ground relay control circuit 62. A continued occurrence of such input pulses causes relay GA1 to drop away. When no vehicle is present, therefore, relay VA1 is picked up but relay GA1 is dropped away and under these circumstances both front contact 63 of relay GA1 and back contact 64 of relay BA1 are open so that there is no energization of relay OCC1 nor of counter 65.

Ordinarily, when there is no interference problem to be contended with, the output pulses of the oscillator 51 appearing on wires 52 and 53 are applied to both transmitting transducers T1 and T2 in parallel. Also, each receiving transducer then at all times supplies its output to its associated receiver. To eliminate the interference problem, this embodiment of the invention contemplates that the two transmitting transducers will alternately receive the output pulses provided by oscillator 51. Also, when transducer T1 has transmitted an output pulse, it is contemplated that the corresponding receiving transducer R1 will for a suitable length of time thereafter be connected to the input of receiver No. 1 so that any reflections of the transmitted pulse, coming from either the pavement or a passing vehicle, will appear as an input signal to receiver No. 1. Throughout such time, the present invention provides that the other receiving transducer, transducer R2, will be shunted so that it will be entirely unaffected by any interfering signal resulting from spurious reflections of the pulse transmitted by the other transmitting transducer. A short time later, these conditions are reversed so that the overall result is that first one vehicle detector unit and then the other is made effective in succession. This alternating operation of the two units is effected by an alternator relay AR which is operated by the electronic circuit shown in the uppermost portion of FIG. 6.

This electronic circuit comprises an Eccles-Jordan flip flop circuit including the two tubes 66 and 67. The operation of such a circuit is similar to that of the multivibrator previously described in that one of the two tubes is at all times conductive and the other is cut off. However, this Eccles-Jordan circuit differs from the multivibrator previously described in that it is not self-running, but has two stable states and is operated from one to the other in response to each trigger pulse appearing on wire 68. These trigger pulses are obtained from the time base pulse generator 50. Thus, each negative-going voltage variation provided by the time base pulse generator 50 and shown at line C of FIG. 5 not only initiates the generation of an electrical pulse of ultrasonic frequency which appears between wires 52 and 53 but also produces a negative-going trigger pulse on wire 68. Each such negative trigger pulse causes the then conductive tube of the two tubes 66 or 67 to be momentarily nonconductive, and this condition results in an instant reversal of the Eccles-Jordan circuit. Thus, beginning at the instant of each negative-going voltage variation at line C of FIG. 5, the Eccles-Jordan circuit assumes a state opposite that which it previously was in and remains in such new state until the instant of occurrence of the next negative-going voltage variation at line C of FIG. 5.

The voltage at the plate of tube 66 thus alternately varies between a high and a low level. This plate voltage is applied through a resistor 69 to the control grid of an amplifier tube 70. When the voltage at the plate of tube 66 is at a low level, tube 70 is cut off because its cathode is maintained at a positive potential by means of the voltage divider comprising resistors 71 and 72 connected in series between the (B+) and ground terminals. However, whenever the voltage at the plate of tube 66 is at the higher level, the cut-off bias is overcome and tube 70 becomes fully conductive. Consequently, the plate voltage of tube 70 is, in effect, an amplified and inverted version of that appearing at the plate of tube 66.

Following this, the plate voltage of tube 70 is further amplified by the power amplifier tube 70' which has the relay AR included in its plate circuit. The overall result is therefore, that this relay AR alternately is picked up and dropped away as the Eccles-Jordan circuit operates alternately between its two opposite states. However, since the relay is a device having both electrical and mechanical inertia, it is important to note that the operation of the relay is somewhat delayed with respect to the operation of the Eccles-Jordan circuit. In other words, when the Eccles-Jordan circuit operates to the condition required that relay AR pick up, the relay will pick up a few milliseconds after the trigger circuit has operated and likewise the relay AR will drop away again a few milliseconds after the Eccles-Jordan circuit has been restored to its previous state. The significance of this delay in operation will soon become apparent.

Under the conditions shown in FIG. 6, with relay AR dropped away, the closed back contact 73 of relay AR shunts the receiving transducer R1, but the receiving transducer for the other unit, R2, is then able to supply a signal to the tuned amplifier associated therewith because of the then open front contact 74. With back contact 75 closed, transmitting transducer T2 is shunted, but the other transducer T1 is then connected to the output of oscillator 51 since its upper wire is connected to the wire 53 and its lower connection is then connected through back contact 75 to wire 52.

When the time base pulse generator 50 generates a negative-going voltage variation in the manner shown at line C of FIG. 5, one effect thereof is to cause oscillator 51 to generate a short pulse of electrical energy at an ultrasonic frequency as has been previously described. With relay AR dropped away as shown in FIG. 6, this short pulse is applied to transducer T1, causing it to transmit a short burst of sound energy. Transducer T2 is not affected at this time because of its being shunted. This same negative-going voltage variation supplied by the time base pulse generator 50 and causing oscillator to generate a short pulse as just described is also applied over wire 68 to the Eccles-Jordan circuit and operates this circuit to the opposite state with the eventual result, after a delay of several milliseconds as described above, of operating relay AR to a picked-up condition. From the description previously given, it is apparent that this has the effect of short circuiting the previously effective receiving transducer R2 and of rendering the other receiving transducer R1 effective by the opening of back contact 73. Thus, the sound pulse transmitted from transducer T1 can now be reflected from any of various reflecting surfaces such as from a vehicle or from the pavement and upon its return via a reflection back to the receiving transducers, will find only the transducer R1 responsive; the transducer R2 will then be shunted.

The next output of the time base pulse generator 50 effective to produce the generation of an ultrasonic frequency pulse on wires 52 and 53 energizes only transmitting transducer T2 since relay AR is then picked up. After a few milliseconds, however, relay AR will drop away, thereby shunting transducer R1 and unshunting transducer R2 so that reflections of the pulse transmitted by transducer T2 and impinging upon transducer R2 can be applied to the input circuits of receiver No. 2.

With the embodiment of the invention illustrated in FIG. 4, it was necessary to slow the repetition rate of the system so that one pulse from one transmitting transducer does not occur until sufficient time has elapsed following the transmission of the preceding pulse by the other transmitting transducer in the interfering unit to permit the proper reception of reflections by such other interfering unit. But in the form of the invention shown in FIG. 6, the repetition rate of the time base generator can remain the same as would ordinarily be employed if the principles of alternation were not employed. However, in this instance, the transmission pulses are transmitted alternately by the two transducers and reflections are received alternately by the respective receivers so that the same overall effect is accomplished on a "shared time" principle; but the basic rate of the time base pulse generator does not have to be changed. The "shared time" principle is thus again employed, using a novel means particularly applicable where a single or common transmitter is used to energize and to generate the various gating voltages used for two adjacent vehicle detector units.

Figure 7:
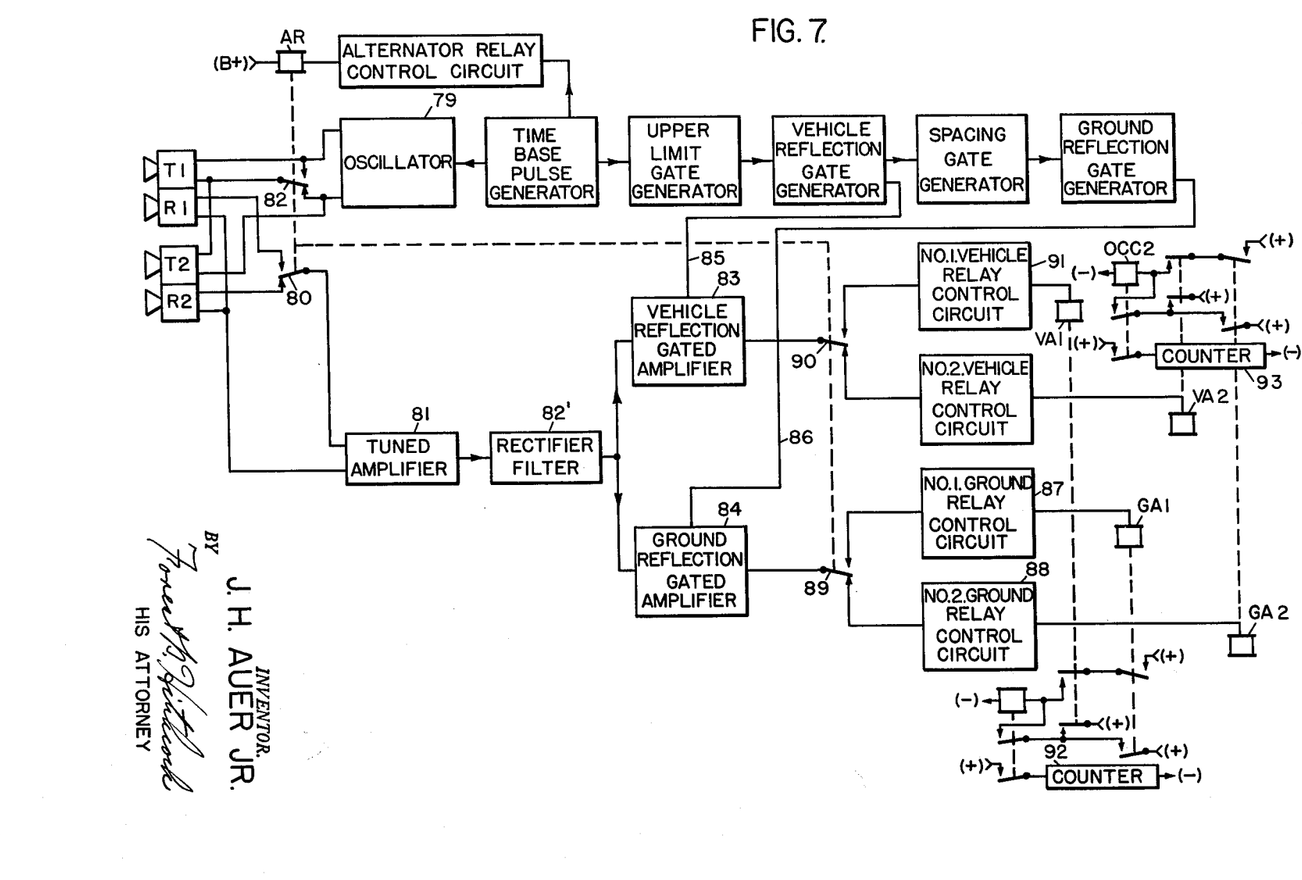

*Embodiment of FIG. 7*

In describing the embodiment of FIG. 6, it was made clear that by using the share-time principle, the two receivers are made alternately effective. Because of this, various portions of each receiver are alternately unused. More specifically, the tuned amplifier of one receiver is not receiving any input signal at a time when the tuned amplifier for the other receiver is connected directly to the single common receiving transducer. From this, it follows that certain equipment for each receiver need not be duplicated but may instead be used in common for the two different receivers. The alternator relay AR which switches the separate receiving and transmitting transducers back and forth in the embodiment of FIG. 6 may also be used to switch such common receiver apparatus back and forth so that first one and then the other of the two sets of vehicle and ground reflection relays can be controlled.

Referring to FIG. 7, the common transmitter organization is illustrated in the upper line of blocks. Since it corresponds exactly to that shown in FIG. 6, it will be unnecessary to describe it in detail here. The control circuit of the alternator relay AR is shown in block form also in FIG. 7 and it will be understood that the apparatus represented by this block corresponds exactly to that shown in the upper portion of FIG. 6. The effect is that the output of the oscillator 79 is applied first to one transmitting transducer and then the other transmitting transducer T2 so that here is an alternate transmission of pulses from these two transducers.

More specifically, whenever back contact 82 of relay AR is closed, the output of oscillator 79 is applied to the transmitting transducer T1 only since the transducer T2 is then shunted. Conversely, whenever relay AR is picked up, only transducer T2 can be energized by the output of oscillator 79 since transducer T1 is then shunted through front contact 82.

The two receiving transducers R1 and R2 are alternately connected by means of contact 80 of relay AR to the input of the single tuned amplifier 81. Whenever relay AR is dropped away, the output of oscillator 79 energizes transducer T1 as already described. Immediately after the occurrence of such output pulse from the oscillator, the time base pulse generator is effective through the alternator relay control circuit to pick up relay AR. When this happens after a few milliseconds, transmitting transducer T1 becomes shunted through front contact 82 and at the same time the closure of front contact 80 connects receiving transducer R1 through such front contact 80 to the input of tuned amplifier 81. The next output pulse of the oscillator is applied to transmitting transducer R2 since relay AR is then picked up. Shortly thereafter, relay AR is dropped away again so that any subsequently received reflections of such next pulse which impinge upon the associated receiving transducer R2 are applied through closed back contact 80 to the input of amplifier 81.

The output of the common tuned amplifier 81 is applied to the rectifier-filter 82' which has the same function as the rectifier-filter 58 previously described, in connection with FIG. 6. The output of the rectifier-filter is applied to both the vehicle reflection gated amplifier 83 and the ground reflection amplifier 84. Each such signal occurring at the time that the vehicle reflection gate is in effect with the required gating voltage appearing on wire 85 produces an output from gated amplifier 83. Similarly, any time there is an output from the rectifier-filter 82' at the time the ground reflection gate is in effect causes an output to be produced by the amplifier 84 since it will then be receiving the required gating voltage over wire 86.

Assuming that there is no vehicle present to intercept either sound beam, then each receiving transducer receives only pulses from the pavement so that each output signal of the rectifier-filter 82' occurs during the existence of the ground reflection gate. Repeated output pulses appearing at the output of the gated amplifier 84 are then applied alternately to the No. 1 ground relay control circuit and No. 2 ground relay control circuit 87 and 88, respectively. More specifically, whenever relay AR is dropped away so that transducer R2 is connected to amplifier 81, the output pulse of the gated amplifier 84 will be applied to the relay control circuit 88 through back contact 89, and the repeated occurrence of such signals will cause relay GA2 to drop away. Similarly, each pavement reflection received by transducer R1 will occur when relay AR is picked up so that the output signal of amplifier 84 produced thereby will be applied through front contact 89 to the relay control circuit 87, and the repeated occurrence of such signals will cause relay GA1 to drop away.

If it is assumed that a vehicle intercepts one of the two sound beams (that transmitted by transducer T1, for example), then each time transducer R1 is connected to the input of amplifier 81 as a result of relay AR being picked up, an output pulse will be provided by the gated amplifier 83 and this will be applied through front contact 90 of relay AR and as such pulses appear successively at the input to the No. 1 vehicle relay control circuit 91, relay VA1 will drop away. Similarly, when transducer R2 is connected to the input of amplifier 81, each output of the vehicle reflection gated amplifier 83 will be applied through back contact 80 of relay AR to the No. 2 vehicle relay control circuit, and the repeated occurrence of such outputs will cause relay VA2 to drop away. From this description, it becomes apparent that either relay for either vehicle detector may be operated independently of the control of the relay for the other vehicle detector so that counts may be registered independently by the two counters 92 and 93.

Figure 8:
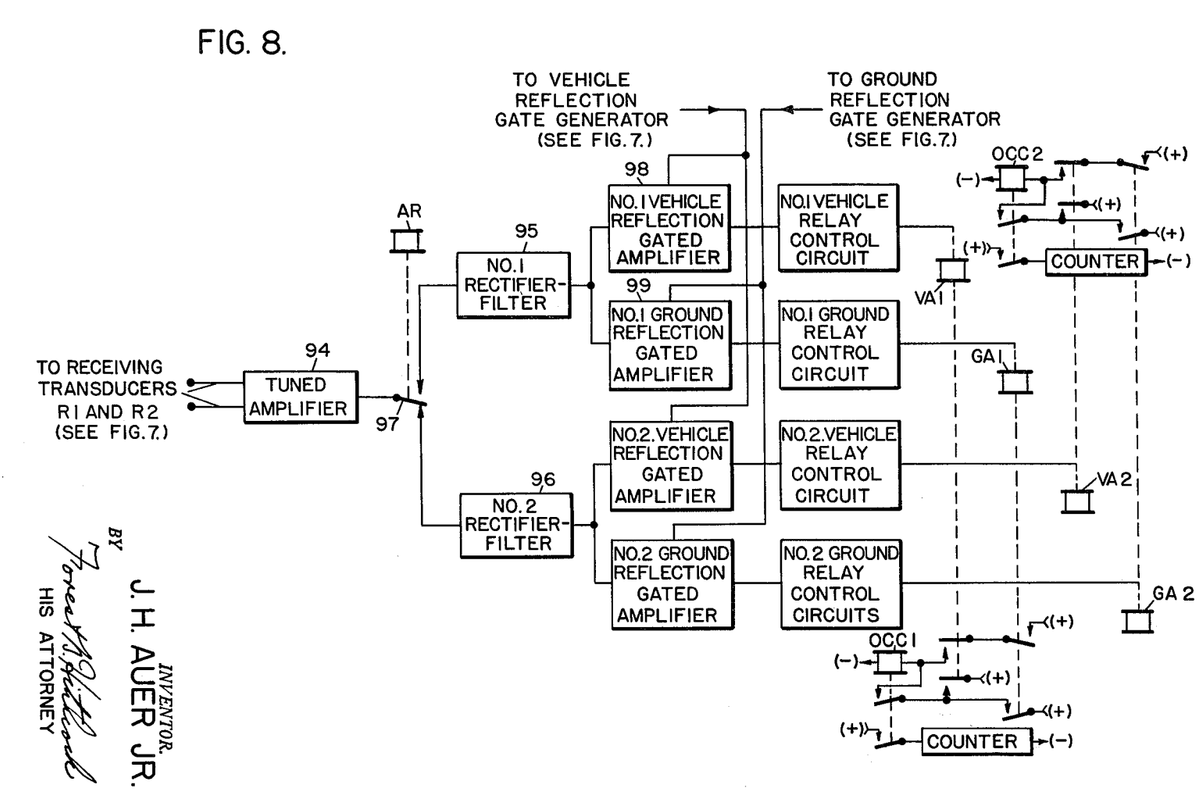

Embodiment of FIG. 8

The embodiment of FIG. 8 is in many respects similar to that of FIG. 7 just described. Thus, exactly the same apparatus is used as shown in FIG. 7 to generate the sound pulses and also to provide the desired gating voltages. It differs, however, in that separate rectifier-filter circuits are employed for the two different receivers rather than a common one. The relay AR which is operated in exactly the same manner as previously described, connects the output of the single, common tuned amplifier 94 alternately to the No. 1 rectifier-filter 95 and the No. 2 rectifier-filter 96. Thus, each input signal received when receiving transducer R1 is connected to amplifier 81 through front contact 80 of relay AR causes an output signal to be supplied by amplifier 94 through front contact 97 of relay AR to the rectifier-filter 95. The output of rectifier-filter is then applied to both a vehicle reflection gated amplifier and a ground reflection gated amplifier such as the amplifiers 98 and 99 associated with the rectifier-filter 95. These two amplifiers are gated, respectively, from a vehicle reflection gate generator and a ground reflection gate generator as indicated. In this way, control of the respective vehicle and ground relays VA1 and GA1 is effected in exactly the same manner as described in connection with FIG. 6. It will be noted that the economy of the apparatus of FIG. 7 is not obtained to the fullest extent in this embodiment of FIG. 8, but the alternation between the two sets of apparatus is, on the other hand, effected by the use of fewer contacts of the alternator relay AR.

Having described an improved vehicle detection system including several embodiments for reducing and eliminating interference between separate vehicle detector units, it is desired to be understood that the various modifications, adaptations, and alterations may be made to the specific forms shown without in any manner departing from the spirit or scope of this invention.

What I claim is:

1. In a system for detecting the passage of vehicles through adjacent first and second detection zones each defined by a respective beam of repetitive energy pulses the combination comprising, first and second transmitting means for transmitting said respective beams of energy pulses, first and second receiving means for said first and second detection zones for at least at times receiving reflections of said energy pulses from at least one reflecting surface whose position is dependent upon whether or not a vehicle is present in the respective detection zone, said reflection pulses for each zone being received by the receiving means for that zone during at least one predetermined time interval following the transmission of the last transmitted pulse for that zone, output means for each detection zone controlled by the receiving means for that zone for indicating the passage of a vehicle through such zone, gating means for controlling each receiving means to be responsive to received energy only throughout said predetermined interval, and control means for preventing said second receiving means from producing an output in response to spurious reflection pulses originating with said first transmitting means and travelling over paths resulting in their having a particular range of expected reception times by said second receiving means, said control means governing said first and second transmitting means to transmit their repetitive pulses at the same repetition rate and with a predetermined time relationship, said time relationship being selected to cause the time of occurrence of said predetermined interval throughout which said second receiving means is controlled by said gating means to be responsive to received energy pulses to be non-contemporanous with said expected reception time of said spurious received pulses.

2. The system as defined in claim 1 wherein said control means causes said transmitting means for the respective adjacent detection zones to transmit said pulses simultaneously.

3. The system as defined in claim 1 wherein said control means causes said first and second transmitting means to transmit said energy pulses sequentially, said control means controlling said first transmitting means to cause an energy pulse to be transmitted only after said gating means has controlled said second receiving means for the other detection zone to be responsive throughout said predetermined interval to reflections of the last energy pulse transmitted by said second transmitting means.

4. In a system for detecting the passage of vehicles through adjacent detection zones, the combination comprising, vehicle detection means for each detection zone comprising a transmitting transducer and also a receiving transducer supplying its output to an associated receiving means, a common sound pulse transmitter means generating repetitive electrical pulses for energizing said transmitting transducers for each zone, gating means for each said vehicle detector means demarcating a predetermined time interval following the transmission of each sound pulse by the respective transmitting transducer, said gating means controlling the respective receiving means to supply a distinctive output only in response to received reflections occurring during said predetermined interval, means included in each vehicle detector means and being controlled by said distinctive outputs of said receiving means to indicate the passage of a vehicle through the respective zone, and switching means controlled by said transmitter means for connecting successive output pulses of such transmitter means sequentially to said transmitting transducers for the respective detection zones, said transmitter means having a repetition rate sufficiently slow that each transmitted pulse does not occur at least until after the expiration of said predetermined time interval following the immediately preceding pulse generated by said transmitter means.

5. The system as defined in claim 4 wherein there are two detection zones and said switching means includes a binary device being operated between first and second opposite states for each successive output of said common transmitter means, said binary device as it operates successively between its first and second states supplying successive outputs of said transmitter means alternately to said two transmitting transducers for the respective two detection zones, said binary device in the interval following the energization of one said transmitting transducer and until the energization of the other transmitting transduced enabling only the receiving transducer and respective receiving means both associated with said one transmitting transducer to be responsive to received sound pulses, whereby following the transmission of a sound pulse by one transmitting transducer only the associated receiving transducer for the same detection zone can be thereafter and until the next occurrence of an output from said transmitter effective to supply output signals corresponding to received reflections of said transmitted pulse to the associated receiving means for that detection zone.

6. The combination as defined in claim 4 wherein said switching means also sequentially renders each receiving transducer and associated receiving means non-responsive to receive sound pulses except in the interval following the transmission of a sound pulse by the respective transmitting transducer and prior to the transmission of the next sound pulse by any other transmitting transducer.

7. In a system for detecting the passage of vehicles through adjacent vehicle detection zones, the combination comprising, vehicle detection apparatus for each zone including sound pulse transmission means for directing sound pulses toward each vehicle passing through the respective zone and including also sound pulse receiving means for receiving reflections of said sound pulses, gating means controlled by said transmitting means for controlling the associated receiving means to be responsive to received reflection pulses only for a predetermined time interval following the transmission of a sound pulse by the associated transmitting means, said sound pulse transmitting means for each detection zone generating a sound pulse only in response to an input control signal, control circuit means for supplying said input control signals sequentially to said sound pulse transmitting means for the respective detection zones to thereby cause the sequential transmission of sound pulses by the respective sound pulse transmitting means, said control circuit means supplying successive input control signals with a sufficient interval therebetween that a sound pulse will be transmitted by one of said transmitting means only when said predetermined time interval occurring after the transmission of the immediately preceding sound pulse has expired, and means for each said detection zone being distinctively controlled by the reflection signals received by the associated receiving means when said detection zone is occupied by a vehicle to thereby indicate the presence of said vehicle.

8. The system according to claim 7 wherein there are two sound pulse transmitting means and said control circuit means comprises a free-running multivibrator alternately acting on said two sound pulse transmitting means to cause them to alternately generate said sound pulses.

9. In a vehicle detection system for detecting the presence of vehicles in two nearby detection zones the combination comprising, vehicle detection apparatus for each zone including a transmitting transducer and a receiving transducer and also a receiving means connected to said receiving transducer, a common transmitter for both said zones generating repetitive electrical pulses for energizing said transmitting transducers, binary means being operated between two opposite states for successive outputs of said transmitting means, said binary means alternately rendering said transmitting transducers for said two zones responsive to the successive repetitive output pulses of said common transmitter, said binary means in the interval following the transmission of a sound pulse by the transmitting transducer for one zone and before the transmission of a pulse by the other transmitting transducer for the other zone controlling only the associated receiving transducer and corresponding receiving means for said one zone to be responsive to received reflection pulses and output means connected to each receiving means and controlled by the occurrence of output signals by said receiving means to a distinctive condition indicative of the passage of a vehicle through the respective detection zone.

10. The system according to claim 9 wherein said binary means includes an electromagnetic relay which alternately connects said transmitting transducers to the output of said common transmitter and also alternately renders the receiving transducer and associated receiving means for the two detection zones alternately incapable of producing output signals in response to received reflection pulses, whereby in the interval following the transmission of a sound pulse by one transmitting transducer only the receiving transducer and associated receiving means for the same detection zone is capable of producing a distinctive output signal for controlling said output means.

11. The system defined in claim 10 wherein said relay is operated from one state to the other only after the transmission of each sound pulse but before the expected reception of reflections of such pulse, said relay in one of its two states connecting the output of said common transmitter to the transmitting transducer for one detection zone but rendering the receiving transducer and associated receiving means for the same zone effective to produce said output signal in response to received reflection pulses only when said relay is in the opposite state.

12. In a system for detecting vehicles as they pass through respective adjacent detection zones, transmitting and receiving transducer means for each zone, transmitter means for generating repetitive pulses for energizing said transmitting transducer means, switching means for applying the successive outputs of said transmitter means sequentially to said transmitting transducer means for the different detection zones, amplifier means, said switching means in the interval following the transmission of a sound pulse by one of said transmitter means for one zone and before the transmission of a pulse by the other transmitter means for the other zone applying only the output of said receiving transducer for said one zone to said amplifier means, whereby in the interval following the transmission of a sound pulse by one transmitting transducer only the associated receiving transducer for that zone has its output applied to said amplifier means, output means for each detection zone being distinctively controlled by the outputs of said amplifier means to thereby indicate the passage of a vehicle through the respective zone, said switching means also connecting the output of said amplifier means sequentially to said output means for the respective zones to thereby cause each output means to be connected to the output of said amplifier means throughout a predetermined interval following the transmission of a sound pulse by the associated transmitting transducer means and before the transmission of a sound pulse by any other transmitting transducer means.

13. The system according to claim 12 wherein there are two adjacent detection zones and said switching means comprises an electromagnetic relay being operated between two alternate states successively for successive output pulses generated by said transmitter means.

14. In a system for detecting vehicles as they pass through respective adjacent detection zones, the combination comprising, transmitting and receiving transducer means for each zone, said transducer means being adapted to direct sound pulses toward each vehicle as it occupies the respective detection zone but with said sound pulses impinging instead upon a fixed and more remote sound reflecting surface when no vehicle is present and also being adapted to receive reflections of said sound pulses alternatively from the vehicle when present in said zone and from said fixed reflecting surface when no vehicle is present, transmitter means for generating repetitive pulses for energizing said transmitting transducer means, gating circuit means controlled by said transmitter means for demarcating a first and a second time interval following the generation of each pulse and encompassing respectively the expected time of reception by the associated receiving transducer means of reflections of said sound pulses from said vehicle and from said fixed reflecting surface, switching means controlled by said transmitter means for sequentially connecting said transmitting transducers for the different zones sequentially to the output of said transmitter means to thereby cause sound pulses to be sequentially transmitted by the respective transmitting transducers, said switching means also sequentially connecting said receiving transducers for the different detection zones to said amplifier means to thereby cause each receiving transducer to be connected to said amplifier means only in the interval following the transmission of a sound pulse by the associated transmitting transducer and prior to the transmission of a subsequent sound pulse by any other transmitting transducer, a first gated amplifier being rendered responsive to the output of said amplifier means only throughout said first time interval and a second gated amplifier being rendered responsive to the output of said amplifier means only throughout each said second time interval, first detection means for each of the respective detection zones, said switching means connecting the output of said first gated amplifier sequentially to said first detector means for the respective zones to thereby cause only the particular first detector means for a particular zone to be responsive to the output of said first gated amplifier in the interval following the transmission of a sound pulse by the transmitting transducer for that zone, second detector means for each of the respective zones, said switching means connecting the output of said second gated amplifier sequentially to said second detector means for the respective zones to thereby also cause said second detector means for each zone to be connected to the output of said second gated amplifier only in the interval following the transmission of a sound pulse by the associated transmitting transducer and prior to the transmission of a sound pulse by any other transmitting transducer, each said detector means being distinctively operated by the outputs it receives from the associated first or second gated amplifier, and means for each zone being controlled by the first and second detector means for that zone for indicating the passage of a vehicle through such zone.

15. The system as defined in claim 14 wherein there are two adjacent zones and said switching means comprises an electromagnetic relay being operated between its opposite conditions in response to successive outputs of said transmitter means.

16. In a system for detecting the presence of objects, a first transmitting means for directing a beam of intermittent sound pulses toward the path of said objects, a first receiving means for receiving reflections of said sound pulses from said objects, a first gating means for rendering said first receiving means responsive to sound energy only for a limited time interval following the transmission of each sound pulse, a first indication means controlled by said first receiving means when reflected sound pulses are received for producing a distinctive output indicative of the presence of an object, a second transmitting means for directing a beam of intermittent sound pulses towards the path of said objects, a second receiving means for receiving reflections of said sound pulses from said objects, a second gating means for rendering said second receiving means responsive to sound energy only for a limited time interval following the transmission of each sound pulse, a second indication means controlled by said second receiving means when reflected sound pulses are received for producing a distinctive output indicative of the presence of an object, and circuit means for causing said first and said second transmitting means to transmit said pulses in synchronism.

17. In a system for detecting the presence of objects, a first and second transmitting means located at spaced points and both for directing a beam of intermittent sound pulses toward said objects, first and second receiving means located at said spaced points both for receiving reflections of said sound pulses from said objects, a single pulse generating means for supplying intermittent sound pulses to both said first and second transmitting means, means for rendering both said first and second receiving means responsive to sound energy only for a limited time interval following the transmission of each sound pulse, and means controlled by said first and said second receiving means effective when reflected sound pulses are received from said objects for giving distinctive indications.

References Cited in the file of this patent
UNITED STATES PATENTS

| | | |
|---|---|---|
| 2,455,639 | Anderson | Dec. 7, 1948 |
| 2,594,276 | Barker | Apr. 29, 1952 |
| 2,841,775 | Saunders | July 1, 1958 |